Dec. 4, 1951  H. E. R. DENT  2,577,407
DEVICE FOR CUTTING AND SLICING VEGETABLES
Filed May 22, 1946

Inventor:
HENRY E. R. DENT
By
Attorney

Patented Dec. 4, 1951

2,577,407

UNITED STATES PATENT OFFICE 2,577,407

DEVICE FOR CUTTING AND SLICING VEGETABLES

Henry E. R. Dent, Rochdale, England, assignor to Colly Products Limited

Application May 22, 1946, Serial No. 671,523
In Great Britain May 22, 1945

2 Claims. (Cl. 30—280)

This invention relates to a device for cutting and slicing vegetables. The primary object of this invention is to provide a device for domestic use which is mainly intended to cut potatoes into lengths of suitable cross section for frying i. e. for making "chips." The device according to this invention may also be used for cutting other vegetables and if desired it may be combined with a device for coring apples.

According to this invention, the device comprises a stem of trough or channel form, a handle secured to one end of the stem and a blade member secured to the opposite end in a transverse plane at right angles to the stem to bridge the strip, said blade member having a cutting edge facing the handle.

In use, when chipping a potato, the device is held by the handle in one hand and the potato placed on the channel portion between the handle and the blade. The device is then drawn along the potato, from which it removes a channel section length. The blade is then placed upon the square edge which has been cut, and the drawing operation is repeated until all of the potato is cut up.

The invention also relates to a device of the type comprising a stem of sheet metal bent to trough or channel form, to one end of which a cylindrical handle is secured with a cutter on the opposite end of the stem said cutter having its cutting edge remote from the handle, that is to say on the end of the device. Devices of this type are intended primarily for coring apples, and according to this invention a device of the type set forth is characterised in that the stem is of L-cross-section and the blade member in conjunction with the stem forms a square aperture, the said blade having a cutting edge on its side facing the handle.

This provides a device which can function both as a "chipper" and also as a corer.

In order that a clear understanding of the invention may be obtained, reference will now be made to the accompanying drawings illustrating a preferred construction wherein.

Figure 1:
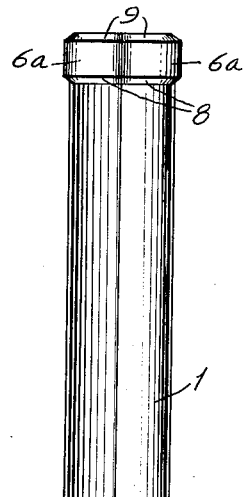
Fig. 1 is an elevation looking into the channel stem.
Figure 2:
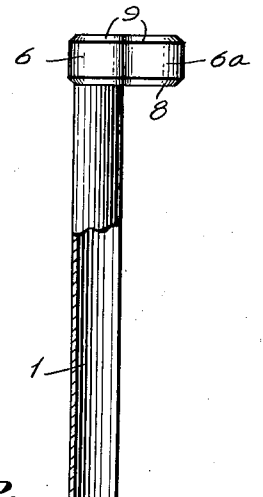
Fig. 2 is a side view of Fig. 1 partly in section.
Figure 3:
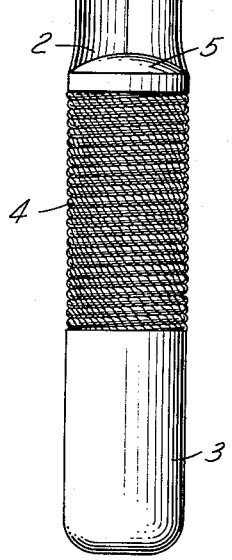
Fig. 3 is a plan view.
Figure 4:
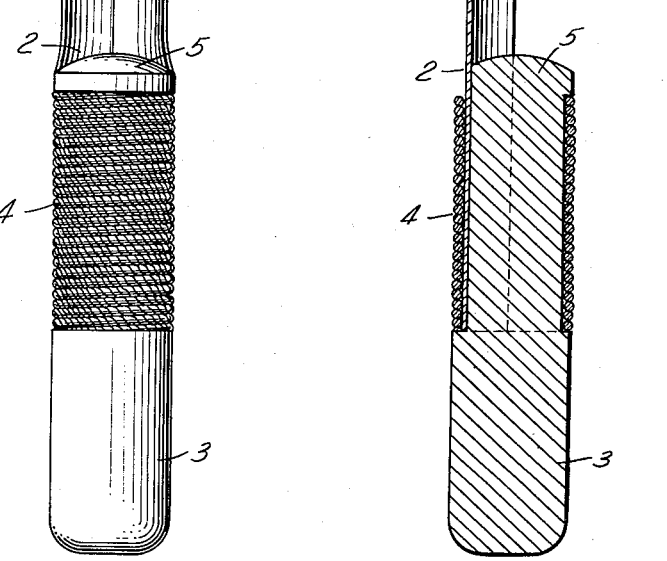
Fig. 4 is an enlarged fragmentary sectional view of the blade and the end of the stem.

In the drawings, a strip of suitable metal 1, e. g. stainless steel is pressed to right angled channel section except for a portion 2 at one end which is of curved or part circular cross-section. The handle 3 consists of a cylinder of wood, synthetic plastic or like material, and the strip is secured thereto by whipping the part circular portion to the one end of handle by suitable cord 4. Preferably, substantially one-half of the handle is of smaller diameter than the remainder with a button like head 5 at this end, the said head being cut away to allow the part circular portion of the strip to fit snugly against the reduced portion of the handle to which it is whipped.

The blade member consists of a metal strip 6, of uniform width, preferably ¼ inch to ½ inch, which is bent to form a four-sided hollow shell of square transverse cross-sectional contour, open at both ends. The sides of the square shell are approximately of a length substantially equal to the width of one of the channel sides so that said blade member can be affixed to the end of the strip remote from the handle forming in conjunction with the strip end a square aperture 7 with two adjacent sides 6a of the blade member upstanding from and bridging the strip. At least the edges 8 of these sides which face the handle are sharpened although for convenience of manufacture the whole side is chamfered as shown. The blade member is conveniently secured to the channel section strip by welding the two sides of said blade member to the outer surfaces of the strip with which they are contiguous.

The device is used as above mentioned, that is to say, the potato is placed on the strip between the handle and cutter and the handle moved relatively to the potato, so that the sharpened edges 8 of the cutter enter the potato. The four edges 9 of the blade member at the front end of the device and the front end of the strip 1 at 9a may also be sharpened, so that the device may also be used to core apples removing a "core" of square cross section, or for "dicing" or cutting other root vegetables.

What I claim is:

1. A device for cutting and slicing vegetables and the like comprising a stem of channel formation having a handle secured to one end thereof, with the portion of the stem projecting from the handle presenting a pair of transversely opposed faces in planes at an angle of 90 degrees apart, and means secured to the stem which in conjunction with said faces of the stem define a tube of square transverse cross-sectional contour at the end of the stem opposite said handle, said means comprising a blade member having a transverse cutting edge facing and spaced from the handle and its opposite transverse edge coterminous with the end of the stem remote from the handle.

2. A device for cutting and slicing vegetables and the like, as claimed in claim 1, wherein the blade member is shaped to form a square shell having sides substantially equal to the width of one of the channel sides of the stem, and said blade member is secured to the stem by means of a pair of adjacent sides of said blade member embracing the outer faces of said channel sides of the stem, and a welded joint between the latter and sides of the blade member embraced thereby.

HENRY E. R. DENT.

REFERENCES CITED

The following references are of record in the file of this patent:

UNITED STATES PATENTS

| Number | Name | Date |
| --- | --- | --- |
| 400,800 | Sholder | Apr. 2, 1889 |
| 707,798 | Paul | Aug. 26, 1902 |
| 757,551 | Guest | Apr. 19, 1904 |
| 1,206,403 | Benedict | Nov. 28, 1916 |
| 2,238,222 | Jones | Apr. 15, 1941 |